US008767506B2

(12) United States Patent
Froelich et al.

(10) Patent No.: US 8,767,506 B2
(45) Date of Patent: Jul. 1, 2014

(54) USING HIGHER ORDER HARMONICS TO DETERMINE ACOUSTIC IMPEDANCE OF MATERIAL BEHIND BOREHOLE CASINGS

(75) Inventors: Benoit Froelich, Marly le Roi (FR); Andrew J. Hayman, Voisins-le-Bretonneux (FR); Kenneth K. Liang, Stow, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 191 days.

(21) Appl. No.: 13/330,676

(22) Filed: Dec. 20, 2011

(65) Prior Publication Data

US 2013/0155812 A1 Jun. 20, 2013

(51) Int. Cl.
*G01V 1/30* (2006.01)
*G01V 1/50* (2006.01)

(52) U.S. Cl.
CPC . *G01V 1/306* (2013.01); *G01V 1/50* (2013.01)
USPC .......................................................... 367/35

(58) Field of Classification Search
CPC ................................. G01V 1/306; G01V 1/50
USPC .......................................................... 367/35
See application file for complete search history.

(56) References Cited

U.S. PATENT DOCUMENTS

| 4,255,798 | A | | 3/1981 | Havira | |
|---|---|---|---|---|---|
| 4,894,807 | A | * | 1/1990 | Alam et al. | 367/15 |
| 5,144,589 | A | * | 9/1992 | Hardage | 367/25 |
| 5,146,432 | A | * | 9/1992 | Kimball et al. | 367/13 |
| 5,216,638 | A | | 6/1993 | Wright | |
| 6,026,913 | A | | 2/2000 | Mandal et al. | |
| 6,041,861 | A | * | 3/2000 | Mandal et al. | 166/250.01 |
| 6,443,900 | B2 | | 9/2002 | Adachi et al. | |
| 6,938,488 | B2 | | 9/2005 | Diaz et al. | |
| 7,656,747 | B2 | | 2/2010 | Mandal et al. | |
| 7,755,973 | B2 | * | 7/2010 | Tello | 367/35 |
| 2010/0061183 | A1 | * | 3/2010 | Mandal et al. | 367/29 |
| 2010/0110831 | A1 | * | 5/2010 | Love et al. | 367/32 |
| 2010/0329081 | A1 | | 12/2010 | Sullivan et al. | |

OTHER PUBLICATIONS

Zeroug & Stanke, "Ultrasonic pulsed beam interaction with a fluid-loaded elastic plate: Theory", 1339 J. Acoust. Soc. Am. 100 (3), Sep. 1996.
Zeroug & Stanke, "Ultrasonic pulsed beam interaction with a fluid-loaded elastic plate: Experimental validation", 1349 J. Acoust. Soc. Am. 100 (3), Sep. 1996.
Dumont, A et al, "A Single Tool for Corrosion and Cement Evaluation," SPE 13140, 1984.
"High-Resolution Cementation and Corrosion Imaging by Ultrasound," A.J. Hayman et al, SPWLA 32nd Annual Symposium, Midland, Texas, Jun. 16-19, 1991.
International Search Report for the equivalent PCT patent application No. PCT/US20121070446 issued on Mar. 1, 2013.

* cited by examiner

*Primary Examiner* — Isam Alsomiri
*Assistant Examiner* — Hovhannes Baghdasaryan
(74) *Attorney, Agent, or Firm* — Stephanie Chi; Jody DeStefanis (57) ABSTRACT

An acoustic logging tool emits a wideband acoustic pulse toward an inside surface of a borehole casing and an acoustic response is received. The acoustic response is analyzed at one or more higher order harmonics of the thickness mode resonance of the casing to determine the acoustic impedance of the material behind the casing.

12 Claims, 6 Drawing Sheets

USING HIGHER ORDER HARMONICS TO DETERMINE ACOUSTIC IMPEDANCE OF MATERIAL BEHIND BOREHOLE CASINGS

BACKGROUND

Typically, a cased hydrocarbon well includes a borehole drilled in a geological formation, a fluid-filled casing disposed in the borehole and cement disposed in an annulus between the casing and the formation. During well logging operations, it can be important to obtain information as to the condition of the casing and the material behind the casing (e.g., cement, water, drilling mud, air, etc.). Ultrasonic logging tools can be used to determine characteristics of the casing and the material behind the casing such as, for example, the thickness of the casing and the acoustic impedance of the material behind the casing. Typically, these measurements are obtained by exciting a casing thickness mode resonance using an ultrasonic acoustic pulse, measuring the temporal period and amplitude decay rate of the acoustic response, and interpreting the data. The thickness mode resonance of the casing in response to the acoustic pulse generally depends on the cement-casing bond, expressed as an acoustic impedance of the cement, and the casing thickness.

SUMMARY

This summary is provided to introduce a selection of concepts in a simplified form that are further described below in the detailed description. This summary is not intended to identify key features or essential features of the claimed subject matter, nor is it intended to be used, in isolation, as an aid in determining the scope of the claimed subject matter. At a high level, embodiments of the subject matter disclosed herein relate to determining an acoustic impedance of a material behind a borehole casing. In embodiments, a wideband acoustic pulse is emitted toward an inside surface of the casing and an acoustic response is received. The acoustic response is analyzed at one or more harmonics of the thickness mode resonance of the casing to determine the acoustic impedance of the material behind the casing. While multiple embodiments are disclosed, still other embodiments will become apparent to those skilled in the art from the following detailed description, which shows and describes illustrative embodiments of aspects of the claimed subject matter. Accordingly, the drawings and detailed description are to be regarded as illustrative in nature and not restrictive.

DETAILED DESCRIPTION

The subject matter of embodiments of the disclosure is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Moreover, although aspects of methods according to embodiments are described with reference to "blocks," the term "block" should not be interpreted as implying any particular order among or between various aspects unless the order of individual aspects is explicitly described.

When introducing elements of various embodiments of the present disclosure, the articles "a," "an," and "the" are intended to mean that there are one or more of the elements. The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments.

Figure 1:
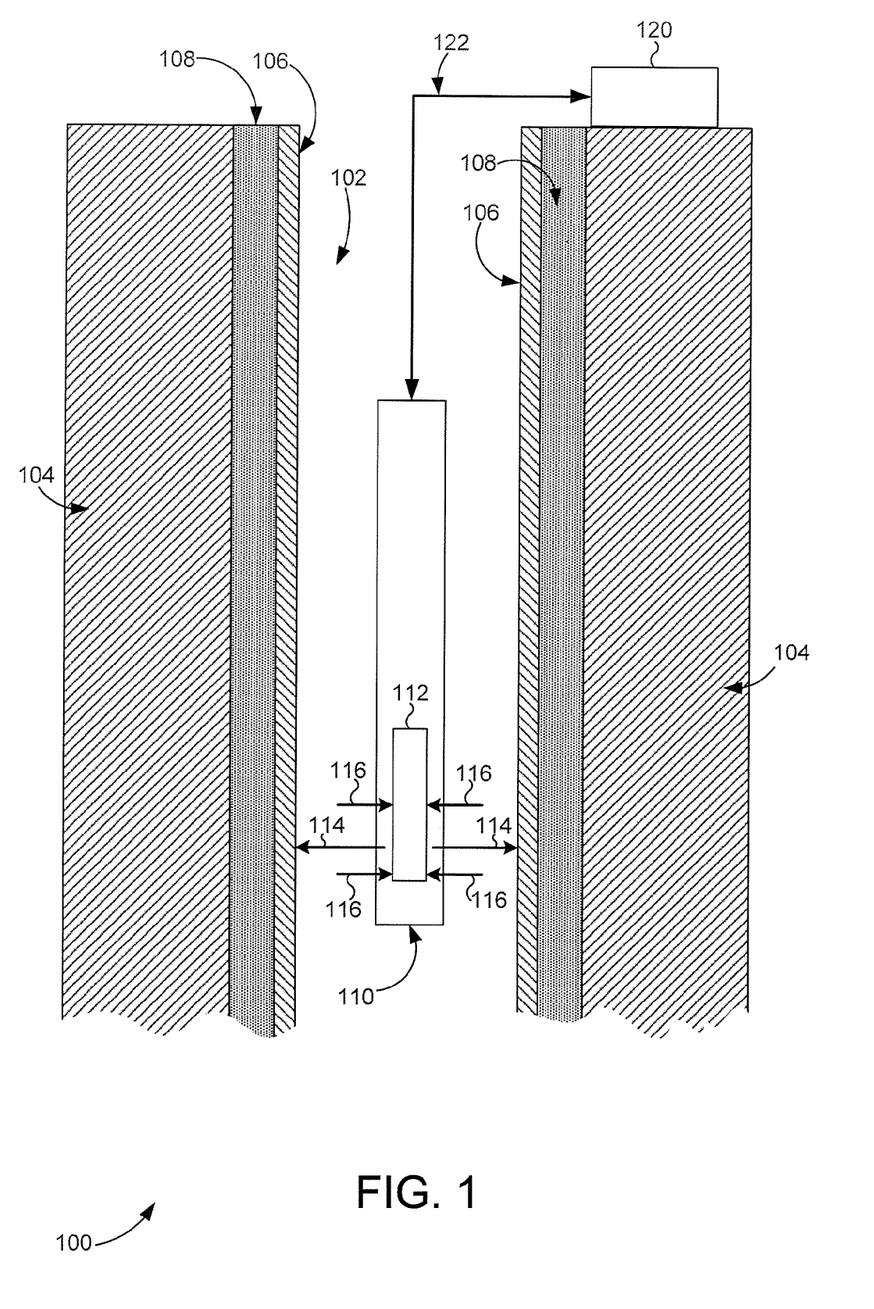
FIG. 1 is a schematic diagram of a well-site acoustic logging system in accordance with embodiments of the disclosure.

Referring to FIG. 1, there is shown an embodiment of a well-site acoustic logging system 100 in accordance with embodiments of the disclosure. An acoustic logging tool 110 can be lowered and raised in a borehole 102 in earth formations 104 while data measurements are recorded by a transducer 112. In embodiments, the acoustic logging tool 110 can be a tool dedicated to acoustic logging such as, for example, the UltraSonic Imager (USI) tool available from Schlumberger Technology Corporation of New York, N.Y. In other embodiments, the tool 110 can be included within a logging-while-drilling (LWD) or measuring-while-drilling (MWD) module associated with a drill string. Casing 106 is set in the borehole 102, and there may typically be cement 108 between the casing 106 and the earth formations 104. In embodiments, the cement 108 prevents migration of fluids between water and hydrocarbon bearing zones in a production zone.

The illustrative well-site acoustic logging system 100 shown in FIG. 1 is not intended to suggest any limitation as to the scope of use or functionality of embodiments disclosed throughout this document. Neither should the illustrative well-site acoustic logging system 100 be interpreted as having any dependency or requirement related to any single component or combination of components illustrated therein. For example, in some embodiments, the illustrative well-site acoustic logging system 100 can include additional components. Additionally, any one or more of the components depicted in FIG. 1 can be, in various embodiments, integrated with any one or more of the other components depicted therein (or components not illustrated). Any number of other components or combinations of components can be integrated with the illustrative well-site acoustic logging system 100 depicted in FIG. 1, all of which are considered to be within the ambit of the disclosed subject matter.

The transducer 112 emits pulses 114 of ultrasonic energy toward the casing 106 and receives reflected echoes ("acoustic responses") 116. According to embodiments, the transducer 112 rotates within the casing 106 to obtain acoustic responses 116 from around at least a portion of the circumferential extent of the casing 106. In other embodiments, the transducer 112 is a phased transducer array that can be used to obtain a number of acoustic responses 116 (e.g., pulse-echo waveforms) along at least a portion of the circumferential extent of the casing 106. In embodiments, the transducer 112 is coupled to electronics in the tool 110 via rotating electrical connections (not shown). The tool 110 can include one or more processors, encoders, and the like. In some embodiments, analysis of acoustic responses 116 can be performed in whole, or in part, by electronics disposed within the tool 110. Additionally, in embodiments, the analysis can be performed in whole, or in part, by surface equipment 120. The tool 110 communicates with surface equipment 120 using a communication link 122. In embodiments, the communication link 122 can include wired communication technologies, wireless communication technologies, seismic communication technologies, and the like.

According to various embodiments, the acoustic response 116 is detected by the transducer 112 as a set of signals, which, in embodiments, are sampled at a selected rate, digitized, multiplexed, and transmitted to the surface equipment 120. In other embodiments, acoustic response signal data can be stored within the tool 110, processed within the tool 110, or the like. In embodiments, computer software is used to analyze the acoustic response 116 to determine characteristics of the casing 106 and the material 108 behind the casing (e.g., cement). For example, in embodiments, the acoustic logging tool 110 excites a resonance of the casing 106 and uses the time decay of the acoustic response to determine the acoustic impedance of the material 108 behind the casing. In some embodiments, the information about these characteristics is determined at a rate that approximates the scanning rate of the acoustic logging tool 110. In an embodiment, this information is displayed on a display device in the surface equipment 120 (e.g., in real time).

According to various embodiments, the relatively low "shear-wave-velocity $(V_s)$ to compressional-wave-velocity $(V_p)$" ratios associated with chrome steel casings can result in inaccurate determinations of acoustic impedance of materials behind the casings when the acoustic impedance determinations are based on analysis of an acoustic response at the thickness mode resonance of the casing. In embodiments, by analyzing the acoustic response, at least in part, at higher order harmonics (e.g., the second harmonic, the third harmonic, etc.) of the thickness mode resonance frequency (e.g., the fundamental frequency corresponding to the thickness mode resonance), more accurate determinations of acoustic impedance of material behind casings with low $V_s/V_p$ ratios can be acquired because the spectral regions associated with higher order harmonics generally are less affected by $V_s$, as shown, for example, in FIG. 2.

Figure 2:
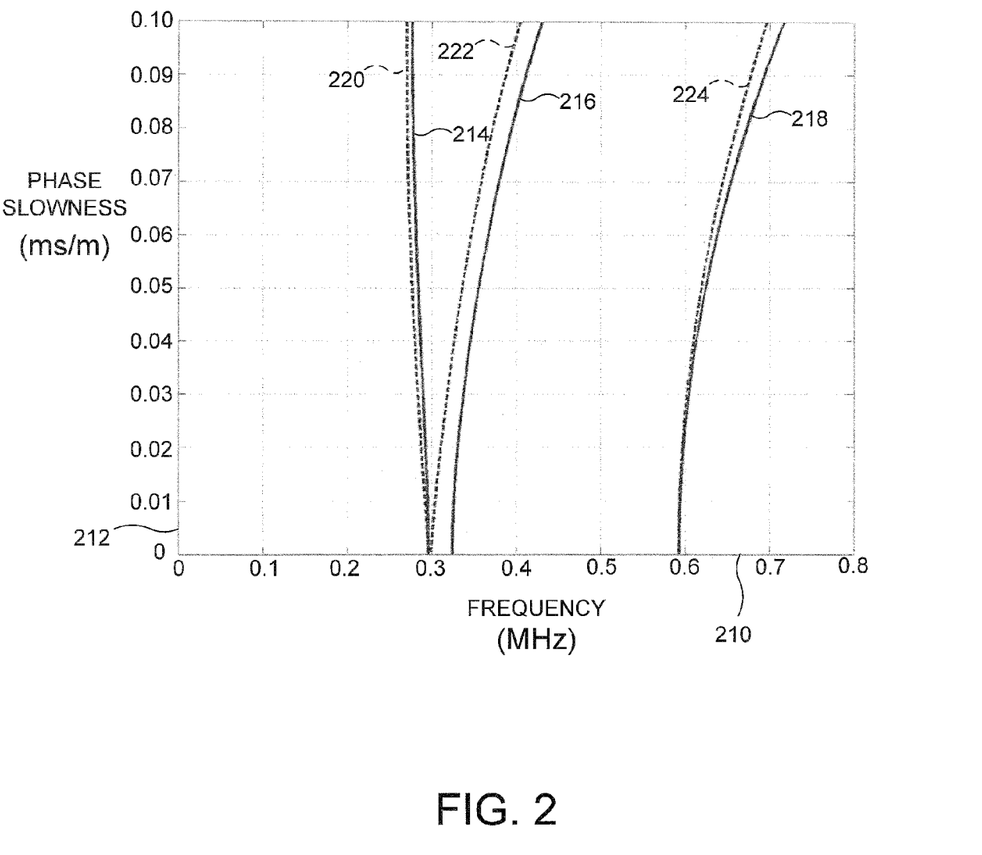
FIG. 2 is a mode dispersion plot around the first and second harmonics for a simulated example case of a steel plate in accordance with embodiments of the disclosure.

FIG. 2 is a mode dispersion plot around the first and second harmonics for a simulated example case of a 10 mm steel plate. The horizontal axis 210 corresponds to frequency (measured in MHz) and the vertical axis 212 corresponds to the slowness of the phase of the mode (measured in ms/m). As shown in FIG. 2, the thickness mode resonance 214 (e.g., first harmonic) of carbon steel (steel having no chromium content) is free of interference from resonances of other, nearby modes 216. However, in chrome casing (e.g., steel casing with at least some chromium content), which has a lower $V_s/V_p$ ratio than carbon steel casing, the second, nearby, mode resonance 222 approaches the thickness mode resonance 220 and perturbs the frequency location and width of the thickness mode resonance, which can lead to erroneous estimation of the acoustic impedance of the material behind the casing. In comparison, the second harmonics 218 and 224 (of the thickness mode resonances 214 and 220, respectively) of carbon steel and chrome steel, respectively, tend to be substantially independent of $V_s$. The same generally is true with respect to other higher order harmonic frequencies. The relative widths of the second and other higher order harmonics also appear to be relatively independent of $V_s$.

Figure 3:
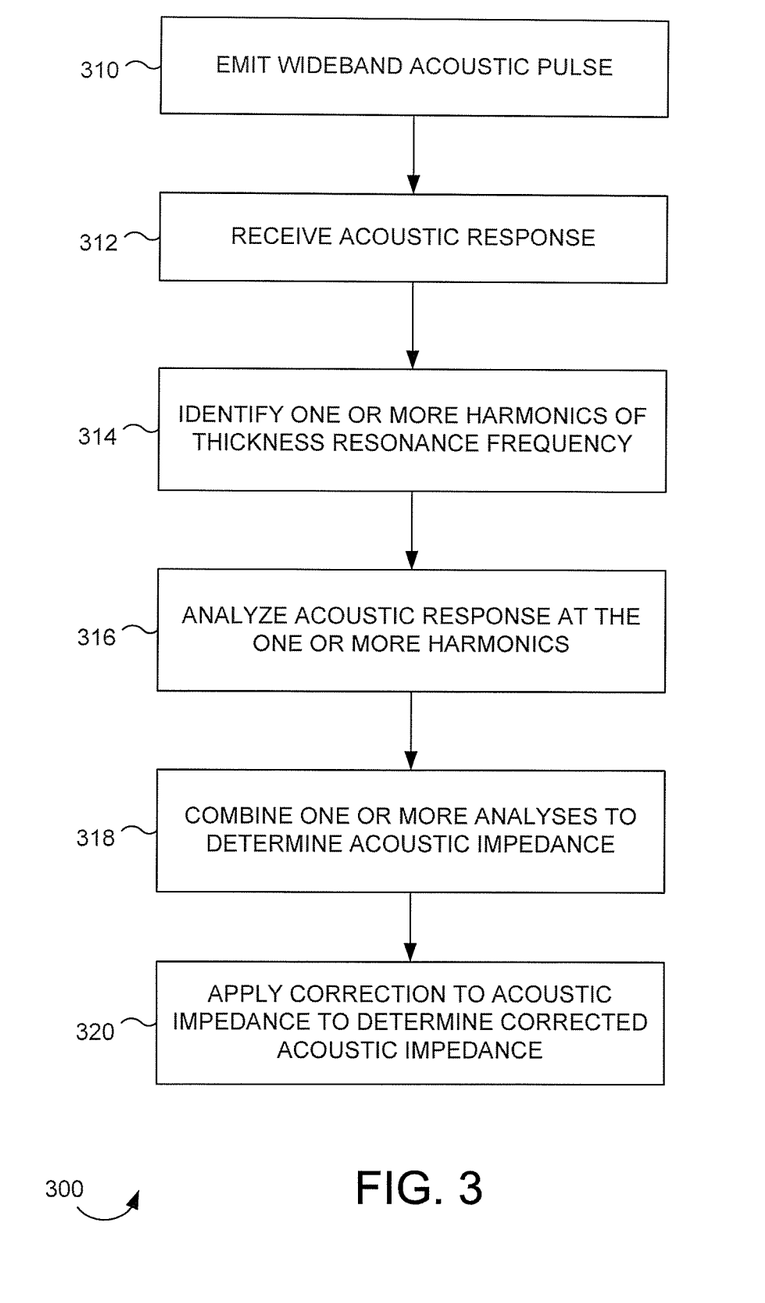
FIG. 3 is a flow diagram illustrating a method of determining an acoustic impedance of a material behind a casing in accordance with embodiments of the disclosure.

FIG. 3 is a flow diagram illustrating an example method 300 of determining an acoustic impedance of a material (e.g., cement, water, air, etc.) behind a casing. According to various embodiments, the casing can be made of any number of different materials such as, for example, carbon steel, chrome steel, and the like. In embodiments of the method 300, a transducer emits a wideband acoustic pulse toward an inside surface of the casing (block 310).

According to various embodiments, the transducer can be controlled to emit wideband acoustic pulses of relatively short duration and having a spectrum covering a frequency range from approximately 200 kHz to approximately 700 kHz. In embodiments, analyzing acoustic responses, at least in part, at higher order harmonics of thickness mode resonances can be achieved by expanding the frequency range of the emitted acoustic pulses. For example, in embodiments, the frequency spectrum can include a range from approximately 200 kHz to approximately 3 MHz. In embodiments, the frequency spectrum can be selected based on the particular task, type of casing, characteristics of the material behind the casing, and the like.

The acoustic logging tool receives an acoustic response corresponding to the emitted acoustic pulse (block 312). The acoustic response is used (e.g., by processing in the frequency domain) to identify one or more higher order harmonics of the thickness mode resonance (block 314). Additionally, in embodiments, the first harmonic (i.e., the fundamental frequency corresponding to the thickness mode resonance) can be identified as well. In embodiments, a second harmonic (e.g., two times the fundamental frequency), third harmonic (e.g., three times the fundamental frequency), and/or higher order harmonics can be identified. In embodiments, identifying the higher order harmonic or harmonics includes identifying a portion of the acoustic response based on a thickness of the casing. That is, in some embodiments, the higher order harmonics are identified by analyzing a region of the frequency spectrum of the acoustic response in a region corresponding to an integer multiple of the thickness mode resonance frequency of the casing. In other embodiments, higher order harmonics can be identified by identifying dips or notches in the frequency spectrum of the acoustic response.

In embodiments of the method 300, the acoustic response is analyzed at the identified higher order harmonic, or harmonics, (and, in embodiments, the first harmonic) to determine the acoustic impedance of the material behind the casing (block 316). In some embodiments, the analysis can also include the first harmonic (i.e., the thickness mode resonance frequency). According to some embodiments, the acoustic impedance of the material behind the casing can be determined by analyzing the acoustic response using an inversion algorithm, where the inversion algorithm analyzes the acoustic response at the higher order harmonic or harmonics.

According to various embodiments, the acoustic response is analyzed at each of the first, second, third and/or other higher order harmonics to generate a set of acoustic-impedance values and the combination of these analyses is used to determine the acoustic impedance (block 318). In embodiments, a comparison of the set of acoustic-impedance values is performed and the acoustic impedance is determined based on the comparison such as, for example, by selecting one of the acoustic impedance values. In some embodiments, the members of the set of acoustic impedance values can be compared with one another to identify consistent patterns, which can be incorporated into the final acoustic impedance determination. Other embodiments include determining the acoustic impedance based on a combination of members of the set of acoustic-impedance values. In some embodiments, the acoustic impedance can be determined based, at least in part, on a $V_s/V_p$ ratio in the steel casing, which may be determined from the ratio of the first harmonic (e.g., fundamental frequency corresponding to the thickness mode resonance) to the second harmonic (e.g., two times the fundamental frequency) (as discussed below, with reference to FIG. 4).

For example, the acoustic impedance, and/or the set of acoustic-impedance values, of the material behind the casing can be determined by analyzing the acoustic response at the higher order harmonic, or harmonics, using an inversion algorithm such as the algorithm described in U.S. Pat. No. 5,216,638, filed Apr. 20, 1990 and issued to Peter Wright on Jun. 1, 1993, which is assigned to Schlumberger Technology Corporation of New York, N.Y., which can be used to determine various characteristics that characterize each of the identified harmonics. In that algorithm, for example, a higher order harmonic can be characterized by a central frequency $F_0$ of the harmonic resonance (e.g., corresponding to a minimum group delay $\tau_{min}$), the depth H of the dip corresponding to the harmonic, and the fractional bandwidth $B/F_0$, where bandwidth B is the width of the dip at a level $\Delta\tau$ above the group delay minimum $\tau_{min}$ equal to a predetermined percentage. Central frequency $F_0$ generally is primarily dependent on the casing thickness while the depth H and fractional bandwidth $B/F_0$ generally are primarily influenced by the acoustic impedances of the mud and the material behind the casing (e.g., cement). In embodiments, these parameters are determined by searching a minimum in a normalized group delay spectrum within a pre-determined frequency range located around a multiple of the thickness mode resonance frequency of the casing.

According to embodiments, the casing thickness and cement impedance can be determined, based on the measured parameters, by iteration using a model. In embodiments, the model can be a planar model (e.g., the casing wall is modeled as a plane) defined by cement impedance $Z_{cem}$, casing thickness d, mud impedance $Z_m$ and casing impedance $Z_p$. In some embodiments, mud impedance $Z_m$ can be obtained by separate calibration, by referencing a database (e.g., a look-up table, a relational database, etc.), or the like. In embodiments, casing impedance $Z_p$ is a known, or estimated, quantity. In other embodiments, casing impedance can be determined from the acoustic response, a database, or the like.

In some embodiments, the acoustic response can be analyzed by determining its response to a Dirac pulse e in the time domain, in which, for example, the initial value for the cement impedance $Z_{cem}$ can be obtained from the measured depth H of resonance (e.g., by using look-up tables, separate calculations, etc.) and the initial value of casing thickness can be derived from central frequency $F_0$. In an embodiment, an impulse response spectrum of the acoustic response can be generated and multiplied by a normalization spectrum representative of the transducer-mud system to obtain a transducer-mud spectrum. In embodiments, the processing window can be applied in the frequency domain by convolution with the transducer-mud spectrum and the group delay spectrum can be computed from the convoluted signal and normalized.

In embodiments, the normalized group delay spectrum can be used to determine reference values for the characteristics of the resonance, e.g., central frequency corresponding to a group delay minimum identified in this spectrum within the specified frequency range, and fractional bandwidth, which can be compared with the measured characteristics. In embodiments, the impedance of the material behind the casing and casing thickness can be determined by direct computation, using pre-established look-up tables relating these characteristics with the characteristics which characterize the resonance, or the like. From the comparison, new estimates for the cement impedance and casing thickness can be defined for a second iteration. According to various embodiments, the iteration is continued until the model group delay response is characterized by the same characteristics as the measured resonance. In embodiments, other methods and algorithms can be utilized to determine acoustic impedance and casing thickness. For example, in some embodiments, different types of windowing schemes, normalization schemes, and the like can be used.

According to various embodiments of the method 300, a corrected acoustic impedance of the material behind the casing can be determined by applying a correction to the determined acoustic impedance of the material (block 320). In some embodiments, the type of casing can be determined (e.g., by referencing inputs, a database, etc.) and corrections can be applied based on the type of casing. For example, in embodiments in which the casing includes carbon steel, a correction associated with the properties (e.g., $V_p$, $V_s$, density, etc.) of carbon steel can be applied to determine a corrected acoustic impedance. In other embodiments, corrections can be applied based on an amount of chrome and/or nickel included within the steel casing, as well as the steel type (e.g., martensitic, duplex, austenitic, etc.). In embodiments, determining the corrected impedance can include determining a wave velocity (e.g., $V_p$, $V_s$, etc.) associated with the casing and applying a correction associated with the wave velocity. As another example, in embodiments, determining the corrected impedance can include determining a density associated with the casing and applying a correction associated with the density.

Figure 4:
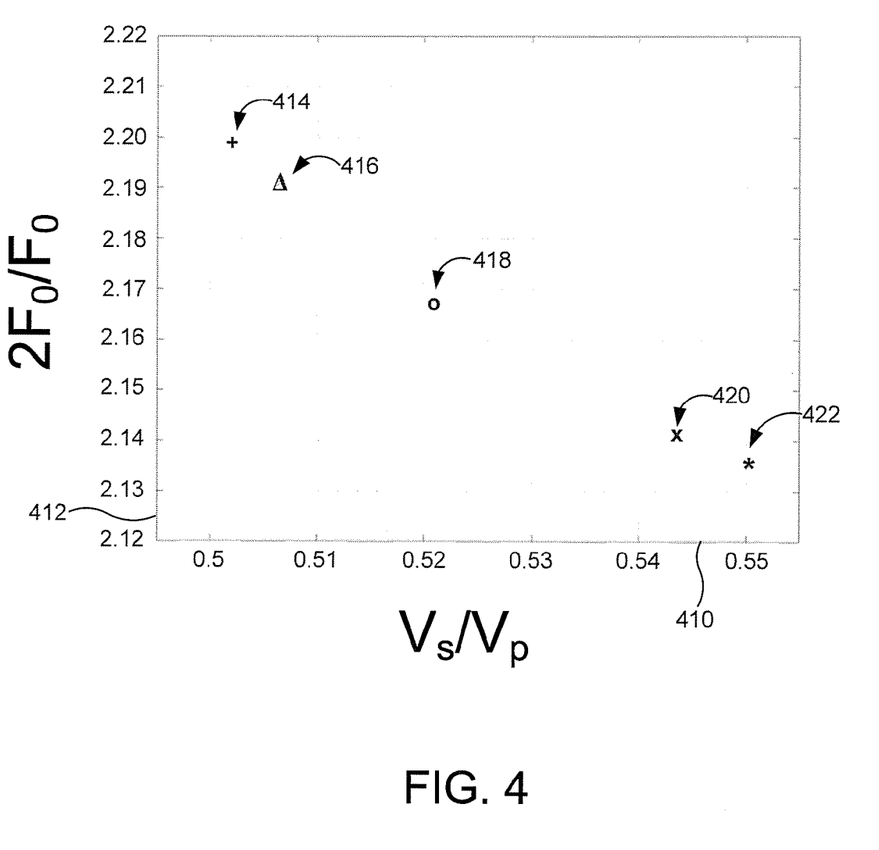
FIG. 4 is a graph illustrating a relationship between a ratio of a second harmonic to a first harmonic and a ratio of shear-wave-velocity to compressional-wave-velocity in accordance with embodiments of the disclosure.

In some embodiments, determining the corrected impedance can include determining a ratio of $V_s/V_p$ associated with the casing and applying a correction associated with the ratio. For example, FIG. 4 is a graph that illustrates an experimentally measured relationship between a frequency ratio of a second harmonic, $2F_0$, to the thickness mode resonance frequency (i.e., first harmonic), $F_0$, and the $V_s/V_p$ ratio for a simulated example casing having an outer diameter of 7 inches and an average thickness of 0.4 inches with water on both the inside and the outside of the simulated casing. In FIG. 4, the horizontal axis 410 corresponds to the $V_s/V_p$ ratio and the horizontal axis corresponds to the frequency ratio, $2F_0/F_0$. As is evident from FIG. 4, for example, the data points associated with 28% chromium steel 414, 27% chromium steel 416, 25% chromium steel 418, 22% chromium steel 420, and carbon steel 422 appear to lie along a substantially smooth curve. Thus, the frequency ratio generally identifies the grade of steel and can quantitatively yield the $V_s/V_p$ ratio. The utility of the relationship illustrated in FIG. 4 is not necessarily limited to the second harmonic but also is true of higher harmonics.

According to various embodiments, 3-dimensional (3D) corrections can be applied to the acoustic impedance based on the geometry of the casing. For example, in some embodiments, a cylindrical correction model can be used. In some embodiments, the correction can be generated using a 3D pulse-echo modeling algorithm such as, for example, is discussed in Zeroug and Stanke, "*Ultrasonic pulsed beam inter-*

*action with a fluid-loaded elastic plate: Theory,"* J. Acoust. Soc. Am. 100 (3), p. 1339, September 1996.

Some embodiments of the disclosed subject matter are described in the general context of computer software, which generally refers to computer-executable instructions. Computer-executable instructions can include, for example, computer code, machine-useable instructions, and the like such as, for example, program components, capable of being executed by one or more processors associated with a computing device. Generally, program components including routines, programs, objects, modules, data structures, and the like, refer to code that, when executed, causes a computing device to perform particular tasks (e.g., methods, calculations, etc.) or implement or manipulate various abstract data types.

Computer-readable media can include both volatile and non-volatile media, removable and nonremovable media, and contemplate media readable by a database, a processor, a router, and various other networked devices. By way of example, and not limitation, computer-readable media can include media implemented in any method or technology for storing information. Examples of stored information include computer-executable instructions, data structures, program modules, and other data representations. Media examples include, but are not limited to, Random Access Memory (RAM); Read Only Memory (ROM); Electronically Erasable Programmable Read Only Memory (EEPROM); flash memory or other memory technologies; Compact Disc Read-Only Memory (CD-ROM), digital versatile disks (DVDs) or other optical or holographic media; magnetic cassettes, magnetic tape, magnetic disk storage or other magnetic storage devices; or any other medium that can be used to encode information and can be accessed by a computing device such as, for example, quantum state memory, and the like.

Embodiments may be practiced in a variety of system configurations, including handheld devices, general-purpose computers, specialty computing devices, servers, workstations, etc. Embodiments may also be practiced in distributed computing environments where tasks are performed by a number of computing devices that are linked through a communications network.

Figure 5:
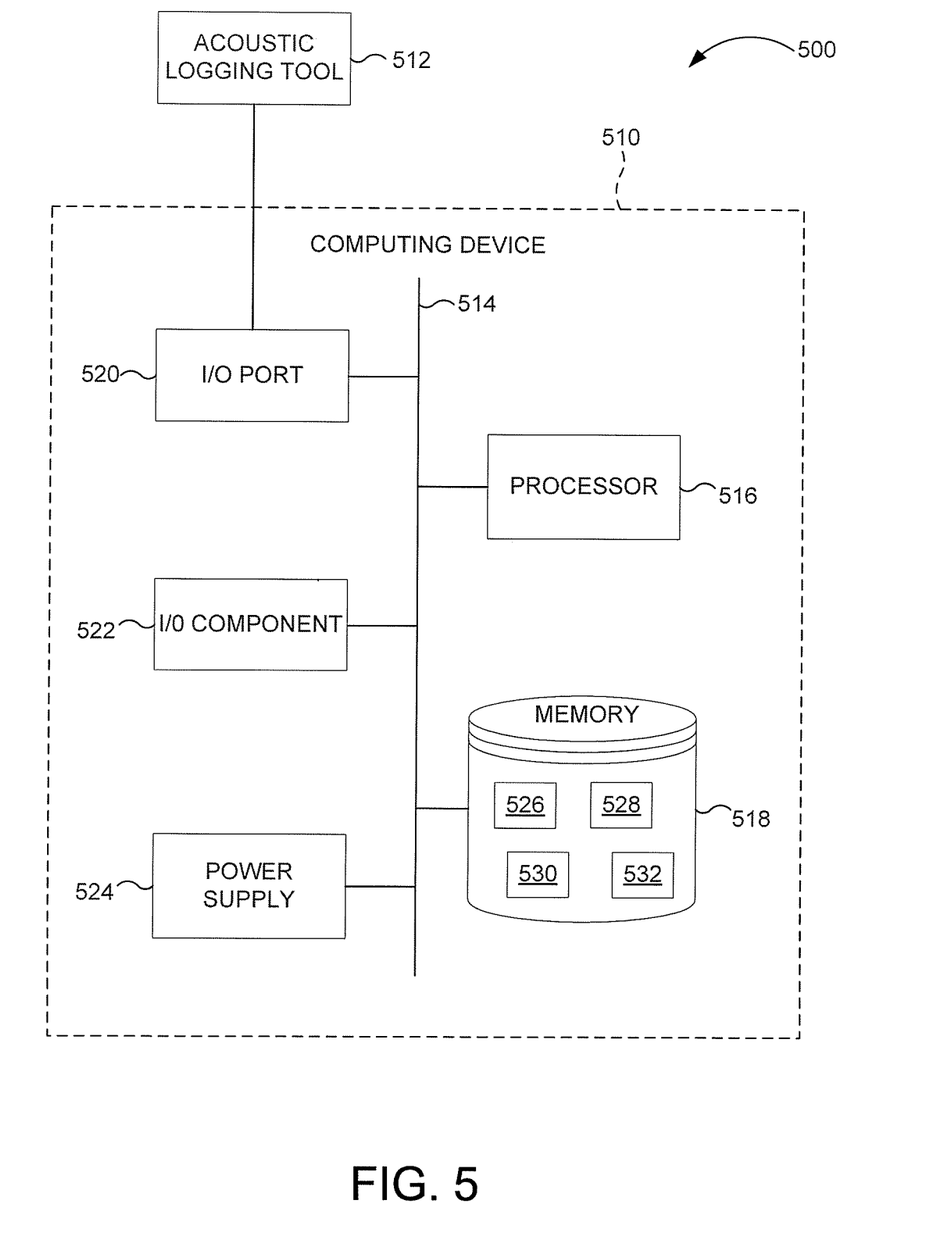
FIG. 5 is a block diagram of an operating environment in accordance with embodiments of the disclosure.

FIG. 5 illustrates an operating environment 500 suitable for implementing various embodiments of the technologies described herein. The operating environment 500 shown in FIG. 5 is not intended to suggest any limitation as to the scope of use or functionality of embodiments of the subject matter disclosed throughout this document. Neither should the operating environment 500 be interpreted as having any dependency or requirement related to any single component or combination of components illustrated therein. For example, in some embodiments, the operating environment 500 can include additional components such as, for example, wireless radios and other communication components. Additionally, any one or more of the components depicted in FIG. 5 can be, in various embodiments, integrated with any one or more of the other components depicted herein (or components not illustrated). Any number of other components or combinations of components can be integrated with the operating environment 500 depicted in FIG. 5, all of which are considered to be within the ambit of the disclosed subject matter.

As illustrated in FIG. 5, the operating environment 500 includes a computing device 510 that is communicatively coupled to an acoustic logging tool 512. According to various embodiments, the computing device 510 can include any type of computing device suitable for implementing embodiments of the subject matter disclosed herein. Examples of computing devices include "workstations," "servers," "laptops," "desktops," "tablet computers," "hand-held devices," and the like, all of which are contemplated within the scope of FIG. 5 and reference to a "computing device." In some embodiments, the computing device 510 can include more than one computing device such as, for example, in a distributing computing environment, a networked environment, and the like. Additionally, according to various embodiments, the computing device 510, or any number of components thereof, can be located within the acoustic logging tool 512, in a surface assembly, or the like.

The computing device 510 includes a bus 514 that, directly and/or indirectly, couples the following devices: a processor 516, a memory 518, an input/output (I/O) port 520, an I/O component 522, and a power supply 524. Any number of additional components, different components, and/or combinations of components can also be included in the computing device 510. The bus 514 represents what may be one or more busses (such as, for example, an address bus, data bus, or combination thereof). Similarly, in some embodiments, the computing device 510 can include a number of processors 516, a number of memory components 518, a number of I/O ports 520, a number of I/O components 522, and/or a number of power supplies 524. Additionally any number of these components or combinations thereof can be distributed and/or duplicated across a number of computing devices. In other embodiments, the computing device 510 may only include two or three of the components illustrated in FIG. 5 such as, for example, a processor 516, a memory 518, or the like.

Although the various components of FIG. 5 are shown with lines for the sake of clarity, in reality, delineating various components of a computing device 510 may not be as clear. For example, I/O components 522 can include devices contained within the computing device 510 and/or devices that are separate from the computing device 510. As another example, processors 516 have memory. As such, the diagram of FIG. 5 is merely illustrative of an example of a computing device 510 that can be used in connection with one or more embodiments, but any number of other configurations for a computing device 510 that can execute computer-executable instructions to accomplish various aspects of the embodiments described herein are also considered to be within the ambit of the disclosed subject matter.

According to various embodiments, the processor 516 (or processors) reads data from various entities such as the memory 518, I/O components 522, or the acoustic logging tool 512. For example, in some embodiments, the processor 516 can execute computer-executable instructions 526 that are stored in the memory 518. Additionally, in some embodiments, the processor 516 can receive computer-executable instructions, signals, or other types of data from the acoustic logging tool 512 such as, for example, acoustic response signals, waveforms, and the like. In some embodiments, these types of data, as well as data associated with characteristics of the casing, the cement, the borehole, the formation, the drilling mud, and the like, can be used as inputs 528, which can be stored in the memory 518 and accessed by the processor 516 during calculations of acoustic impedance.

As the processor 516 reads and manipulates data, it can also cause data to be stored in the memory 518. The memory 518 may include computer-storage media in the form of volatile and/or nonvolatile memory. The memory 518 may be removable, nonremovable, or a combination thereof. Examples of hardware memory devices include solid-state memory, hard drives, optical-disc drives, and the like. As shown in FIG. 5, the memory 518 stores computer-executable instructions 526 (e.g., a cement-logging application) for causing the processor 516 to perform various aspects of embodiments of the methods discussed herein. Additionally, in some embodiments, the processor 516 can store outputs 530 in the memory 518 which can be used by the processor 516 in further calculations, maintained for future use, presented to a user via the I/O component 522 such as, for example, a presentation component (e.g., a display, a printing device, a touch-screen I/O display, etc.) and the like. In embodiments, such outputs can include acoustic impedances (e.g., of the casing, the material behind the casing, etc.), corrections, corrected acoustic impedances, sets of acoustic impedance values, and the like.

Additionally, in embodiments, one or more databases 532 can be stored in the memory 518. The databases 532 can include, for example, look-up tables having various types of different parameter values associated with casing compositions, drilling mud properties, wave velocities, and the like. In embodiments, for example, the databases 532 can be referenced by the processor 516 to facilitate applying corrections to determined acoustic impedances.

In some embodiments, the I/O port 520 may allow a computing device to be logically coupled to other devices including devices associated with the acoustic logging tool 512 and I/O components 522, some of which may be built in. Examples of I/O components 522 include a microphone, joystick, game pad, satellite dish, scanner, printer, wireless transceiver, keyboard, pen, voice-input device, touch-input device, touch-screen device, interactive display device, a mouse, and the like. I/O components 522 can also include presentation components that present data indications to a user or other device. Examples of presentation components include a display device, speaker, printing component, vibrating component, indicator light, and the like.

As indicated above, the computing device 510 can be used to analyze acoustic responses from emitted wideband acoustic pulses to determine various characteristics of a casing and/or a material behind the casing (e.g., casing thickness, acoustic impedance, etc.). In embodiments, the processor (or processors) 516 execute computer-executable instructions 526 that, when executed, cause the computing device 510 to perform one or more methods for processing the acoustic response. In embodiments, the computer-executable instructions 526 can be a computer program that includes a number of components for performing aspects of embodiments of the methods.

Figure 6:
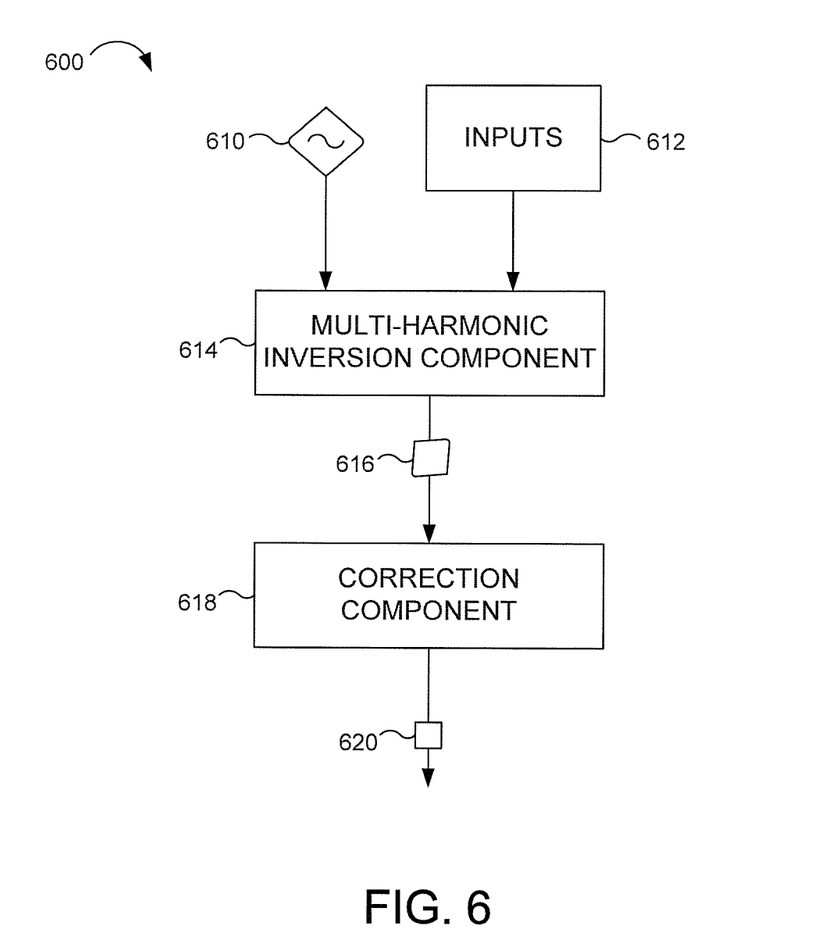
FIG. 6 is a schematic flow diagram illustrating a method of analyzing an acoustic response corresponding to a transmitted acoustic pulse in accordance with embodiments of the disclosure.

FIG. 6 is a schematic diagram illustrating an example of a processing flow 600 for analyzing an acoustic response from an emitted wideband acoustic pulse to determine an acoustic impedance of a material behind a casing. As shown, the acoustic response 610 is provided to a multi-harmonic inversion component 614. Additional inputs 612 also are provided to the multi-harmonic inversion component 614. In embodiments, the inputs 612 can include, for example, an acoustic impedance of fluid within the borehole (e.g., drilling mud), $Z_{mud}$; a compressional velocity of the borehole fluid, $V_{mud}$; information about the geometry of the casing (e.g., inside casing diameter, outside casing diameter, casing steel grade, casing steel composition, etc.); a reference acoustic impedance of the material behind the casing, and the like.

In embodiments, the multi-harmonic inversion component 614 identifies one or more higher order harmonics (and, in some embodiments, the thickness mode resonance frequency—first harmonic) of the thickness mode resonance frequency associated with the casing and analyzes the acoustic response 610 at the one or more higher order harmonics (and, in some embodiments, the first harmonic) to determine the acoustic impedance 616 of the material behind the casing. For example, in embodiments, the multi-harmonic inversion component 614 can apply an inversion algorithm such as the algorithm described in U.S. Pat. No. 5,216,638, filed Apr. 20, 1990 and issued to Peter Wright on Jun. 1, 1993, which is assigned to Schlumberger Technology Corporation of New York, N.Y. In some embodiments, the multi-harmonic inversion component 614 performs the inversion algorithm at each of the identified harmonics (e.g., first harmonic, second harmonic, third harmonic, etc.) to determine a set of acoustic impedance values. The multi-harmonic inversion component 614 determines the acoustic impedance 616 based on a comparison or combination of these values.

A correction component 618 determines a corrected acoustic impedance 620 of the material behind the casing by applying a correction to the determined acoustic impedance 616. In some embodiments, a comparison of an inverted acoustic impedance 616 with a reference acoustic impedance (e.g., provided as an input 612) identifies corrections to be applied by the correction component 618. In some embodiments, for example, a static deviation of the acoustic impedance 616 from an expected value for the acoustic impedance (e.g., the reference acoustic impedance) can be removed through a correction procedure using nominal values of the compressional-wave velocity, $V_p$, and shear-wave velocity, $V_s$, as input. Additionally, in embodiments, look-up tables of parameters related to casing composition, wave velocities, and the like, can be used to determine corrections to apply to the acoustic impedance 616 to determine the corrected acoustic impedance 620.

The present subject matter has been described in relation to particular embodiments, which are intended in all respects to be illustrative rather than restrictive. Alternative embodiments will become apparent to those of ordinary skill in the art to which the disclosed subject matter pertains without departing from its scope. For example, in embodiments, the use of higher order harmonics can be used with any number of different ultrasonic methods for determining the acoustic characteristics of the casing and properties of the material behind the casing by utilizing an ultrasonic pulse directed substantially perpendicular to a localized area of the casing wall with the intent of stimulating a thickness mode resonance in the wall of the casing. It will be understood that certain features and subcombinations are of utility and may be employed without reference to other features and subcombinations. This is contemplated by and is within the scope of the claims.

The following is claimed:

1. A method of determining an acoustic impedance of a material behind a casing, the method comprising:

emitting a wideband acoustic pulse toward an inside surface of the casing;

receiving an acoustic response corresponding to the emitted acoustic pulse;

identifying at least one second or higher order harmonic of a thickness mode resonance frequency associated with the casing, wherein the at least one second or higher order harmonic comprises a second order harmonic, a third order harmonic, a higher order harmonic, or combinations thereof;

analyzing the acoustic response at the at least one second or higher order harmonic to determine the acoustic impedance of the material identifying the thickness mode resonance frequency associated with the casing;

analyzing the acoustic response at the thickness mode resonance frequency and at each of the at least one second or higher order harmonic to determine the acoustic impedance of the material and to generate a set of acoustic-impedance estimates; and performing a comparison of the set of acoustic-impedance estimates and determining the acoustic impedance based on the comparison.

2. The method of claim 1, further comprising determining the acoustic impedance based on a combination of members of the set of acoustic-impedance estimates.

3. A method of determining an acoustic impedance of a material behind a casing, the method comprising:

emitting a wideband acoustic pulse toward an inside surface of the casing; receiving an acoustic response corresponding to the emitted acoustic pulse;

identifying at least one second or higher order harmonic of a thickness mode resonance frequency associated with the casing, wherein the at least one second or higher order harmonic comprises a second order harmonic, a third order harmonic, a higher order harmonic, or combinations thereof; analyzing the acoustic response at the at least one second or higher order harmonic to determine the acoustic impedance of the material wherein analyzing the acoustic response comprises: generating a waveform model based on the acoustic response; and processing the waveform model using an inversion algorithm, wherein the inversion algorithm analyzes the waveform model at the at least one second or higher order harmonic.

4. The method of claim 3, further comprising determining that the casing comprises carbon steel, wherein analyzing the acoustic response further comprises determining a corrected acoustic impedance associated with carbon steel.

5. The method of claim 3, further comprising determining a wave velocity associated with the casing, the wave velocity being one of a compression wave velocity and a shear wave velocity, wherein analyzing the acoustic response further comprises determining a corrected acoustic impedance associated with the wave velocity.

6. The method of claim 3, further comprising determining a density associated with the casing, wherein analyzing the acoustic response further comprises determining a corrected acoustic impedance associated with the density.

7. The method of claim 3, further comprising:

determining a first ratio, wherein the first ratio is a ratio of the second harmonic frequency with the thickness mode resonance frequency;

determining a second ratio based on the first ratio, wherein the second ratio is a ratio of compression-wave velocity to shear-wave velocity associated with the casing; and determining a corrected acoustic impedance by applying a correction based on the second ratio.

8. A method of determining a an acoustic impedance of a material behind a casing, the method comprising:

emitting a wideband acoustic pulse toward an inside surface of the casing;

receiving an acoustic response corresponding to the emitted acoustic pulse;

generating a waveform model based on the acoustic response;

identifying at least one second or higher order harmonic of a thickness mode resonance frequency associated with the casing by analyzing the waveform model;

determining an acoustic impedance of the material by analyzing the waveform model at the at least one second or higher order harmonic; and determining a corrected acoustic impedance of the material by applying a correction to the acoustic impedance of the material.

9. The method of claim 8, wherein determining the acoustic impedance of the material comprises analyzing the waveform at the thickness mode resonance frequency and at each of a plurality of higher order harmonics to generate a set of acoustic-impedance estimates and determining the acoustic impedance based on a combination of members of the set of acoustic-impedance estimates.

10. The method of claim 8, wherein identifying the at least second or higher order harmonic includes identifying a portion of the acoustic response based on a thickness of the casing.

11. A system for determining an acoustic impedance of a material behind a steel casing, the system comprising:

an ultrasonic-imaging (USI) tool having an acoustic transducer that emits a wideband acoustic pulse toward the casing and receives an acoustic response thereto; and a computing device including a processor and a computer-readable medium having computer-executable instructions embodied thereon that, when executed by the processor, causes the computing device to determine an acoustic impedance of the material, the computer-executable instructions comprising:

a waveform model generator that generates a waveform model based on the acoustic response; and an inversion component that identifies at least one second or higher order harmonic of a thickness mode resonance frequency associated with the casing by analyzing the waveform model, wherein the inversion component analyzes the waveform model at the at least one second or higher order harmonic to determine the acoustic impedance of the material wherein the computer-executable instructions further comprise a correction component that determines a corrected acoustic impedance of the material by applying a correction to the determined acoustic impedance of the material.

12. The system of claim 11, wherein the inversion component analyzes the waveform model at the thickness mode resonance frequency and at each of the plurality of second, or higher order harmonics to generate a set of acoustic-impedance estimates and wherein the inversion component determines the acoustic impedance based on a combination of members of the set of acoustic-impedance estimates.

* * * * *